US012353949B2

(12) United States Patent
Handshaw et al.

(10) Patent No.: US 12,353,949 B2
(45) Date of Patent: Jul. 8, 2025

(54) INDICIA TRACKING AND DECODING SYSTEMS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US); David P. Goren, Smithtown, NY (US); Binyamin Stein, Flushing, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/140,587

(22) Filed: Apr. 27, 2023

(65) Prior Publication Data
US 2024/0362438 A1 Oct. 31, 2024

(51) Int. Cl.
*G06K 7/10* (2006.01)
*G06T 7/50* (2017.01)
(Continued)

(52) U.S. Cl.
CPC ............ *G06K 7/10722* (2013.01); *G06T 7/50* (2017.01); *G06T 7/70* (2017.01); *G06V 10/761* (2022.01);
(Continued)

(58) Field of Classification Search
CPC ... G06T 7/50; G06T 7/70; G07G 1/00; G07G 1/0036; G07G 1/0054; G07G 1/0063;
(Continued)

(56) References Cited

U.S. PATENT DOCUMENTS 7,448,542 B1 * 11/2008 Bobbitt ................ G06Q 20/208
235/383
7,909,248 B1 * 3/2011 Goncalves ........... G07G 1/0072
235/462.14

(Continued)

OTHER PUBLICATIONS

International Search Report and Written Opinion for International Application No. PCT/US2024/026063 mailed on May 21, 2024.

(Continued)

*Primary Examiner* — Daniel I Walsh
(74) *Attorney, Agent, or Firm* — Yuri Astvatsaturov

(57) ABSTRACT

The present disclosure provides new and innovative systems, methods, and apparatuses for detecting non-decode events in indicia scanning settings. In an example, a system comprises a depth imaging assembly, a 2D imaging assembly, and a processing device, wherein the processing device is configured to attempt to decode an indicium affixed to a first item that is passing through at least one of a field of view of the 2D imaging assembly or a field of view of the depth imaging assembly, determine a first characteristic associated with the first item based on depth data from the depth imaging array, and responsive to a failed attempt to decode the indicium, detect a second item that is passing through the field of view of the 2D imaging assembly and the field of view of the depth imaging assembly, determine a second characteristic associated with the second item based on depth data from the depth imaging assembly, determine if the first item is a same item as the second item based on comparing the first characteristic and the second characteristic, and responsive to determining that the first item and the second item are not the same item, transmit a message to an alert module that is indicative of a non-decode event.

15 Claims, 10 Drawing Sheets

(51) Int. Cl.
  *G06T 7/70* (2017.01)
  *G06V 10/74* (2022.01)
  *G06V 40/10* (2022.01)
(52) U.S. Cl.
  CPC .. *G06V 40/107* (2022.01); *G06T 2207/10024* (2013.01); *G06T 2207/30196* (2013.01); *G06V 2201/07* (2022.01)
(58) Field of Classification Search
  CPC .... G07G 1/0072; G07G 3/00; G06K 7/10722; G06V 2201/07
  See application file for complete search history.

(56) References Cited

U.S. PATENT DOCUMENTS

| | | | | |
|---|---|---|---|---|
| 11,481,751 | B1* | 10/2022 | Chaubard | G06V 10/82 |
| 11,636,457 | B1* | 4/2023 | De Bonet | G06Q 20/204 |
| | | | | 705/23 |
| 11,727,229 | B1* | 8/2023 | Lupo | G06K 7/1443 |
| | | | | 235/462.14 |
| 2002/0166388 | A1* | 11/2002 | Ganapathi | G06V 40/1306 |
| | | | | 73/862.046 |
| 2004/0065740 | A1* | 4/2004 | Mergenthaler | G06K 7/1096 |
| | | | | 235/462.14 |
| 2011/0198399 | A1 | 8/2011 | Sano | |
| 2013/0175339 | A1* | 7/2013 | Svetal | G07G 1/0054 |
| | | | | 235/383 |
| 2014/0001266 | A1* | 1/2014 | Collins, Jr. | G06K 7/10861 |
| | | | | 235/462.13 |
| 2014/0021258 | A1* | 1/2014 | Olmstead | G06K 7/10544 |
| | | | | 235/462.41 |
| 2015/0193761 | A1* | 7/2015 | Svetal | G06Q 20/208 |
| | | | | 705/23 |
| 2016/0350931 | A1* | 12/2016 | Costello | G06Q 20/208 |
| 2018/0314863 | A1* | 11/2018 | Gao | G06K 7/1456 |
| 2019/0120770 | A1* | 4/2019 | Chen | G01B 11/303 |
| 2021/0142306 | A1* | 5/2021 | Nimiya | G06Q 30/0633 |
| 2021/0158000 | A1* | 5/2021 | Fjellstad | G06K 7/10881 |
| 2021/0374373 | A1* | 12/2021 | Astvatsaturov | G06V 40/172 |
| 2021/0374376 | A1* | 12/2021 | Swope | G06K 7/1417 |
| 2022/0414587 | A1* | 12/2022 | Maung | G06V 20/52 |
| 2023/0043615 | A1* | 2/2023 | Saitoh | G06Q 30/06 |
| 2023/0056327 | A1* | 2/2023 | Brakob | G06V 20/44 |
| 2023/0100920 | A1* | 3/2023 | Ushijima | G07G 1/0018 |
| | | | | 348/143 |
| 2023/0147769 | A1* | 5/2023 | Hagen | G06Q 20/208 |
| | | | | 705/23 |
| 2023/0274560 | A1* | 8/2023 | Bordone Molini | G06V 10/764 |
| | | | | 382/103 |
| 2024/0362441 | A1* | 10/2024 | Barkan | G06T 7/73 |

OTHER PUBLICATIONS

Written Opinion issued by the United States Patent and Trademark Office on May 21, 2024, in International Patent Application No. PCT/US2024/026063 (6 pages).

International Search Report issued by the United States Patent and Trademark Office on May 21, 2024, in International Patent Application No. PCT/US2024/026063 (2 pages).

* cited by examiner

INDICIA TRACKING AND DECODING SYSTEMS

BACKGROUND

Indicia decoding is a process by which information which is visually encoded on an item can be easily and quickly discerned by a computerized system. Common settings which employ indicia decoding devices include inventory management and retail, among many others. In retail settings, indicia decoding devices can commonly be found in self-service kiosks which operate with minimal supervision from store employees.

SUMMARY

The present disclosure provides new and innovative systems, methods, and apparatuses for detecting non-decode events in indicia scanning settings. In an example, a system comprises a depth imaging assembly, a 2D imaging assembly, and a processing device, wherein the processing device is configured to attempt to decode an indicium affixed to a first item that is passing through at least one of a field of view of the 2D imaging assembly or a field of view of the depth imaging assembly, determine a first characteristic associated with the first item based on depth data from the depth imaging array, and responsive to a failed attempt to decode the indicium, detect a second item that is passing through the field of view of the 2D imaging assembly and the field of view of the depth imaging assembly, determine a second characteristic associated with the second item based on depth data from the depth imaging assembly, determine if the first item is a same item as the second item based on comparing the first characteristic and the second characteristic, and responsive to determining that the first item and the second item are not the same item, transmit a message to an alert module that is indicative of a non-decode event.

In an example, a computer-implemented method comprises attempting to decode an indicium affixed to a first item that is passing through at least one of a field of view of the 2D imaging assembly or a field of view of the depth imaging assembly, determining a first characteristic associated with the first item based on depth data from the depth imaging array, and responsive to a failed attempt to decode the indicium detecting a second item that is passing through the field of view of the 2D imaging assembly and the field of view of the depth imaging assembly, determining a second characteristic associated with the second item based on depth data from the depth imaging assembly, determining if the first item is a same item as the second item based on comparing the first characteristic and the second characteristic, and responsive to determining that the first item and the second item are not the same item, transmitting a message to an alert module that is indicative of a non-decode event.

In an example, an apparatus includes a non-transitory computer-readable medium containing instructions which, when executed by a processing device, cause the processing device to attempt to decode an indicium affixed to a first item that is passing through at least one of a field of view of the 2D imaging assembly or a field of view of the depth imaging assembly, wherein the indicium is a universal product code, determine a first characteristic associated with the first item based on depth data from the depth imaging array, wherein the first characteristic is at least one of a color, a size, a shape, or a curvature of the first item, and responsive to a failed attempt to decode the indicium detect a second item that is passing through the field of view of the 2D imaging assembly and the field of view of the depth imaging assembly, determine a second characteristic associated with the second item based on depth data from the depth imaging assembly wherein the second characteristic is at least one of a color, a size, a shape, or a curvature of the second item, determine if the first item is a same item as the second item based on comparing the first characteristic and the second characteristic, and responsive to determining that the first item and the second item are not the same item, transmit a message to an alert module that is indicative of a non-decode event.

Additional features and advantages of the disclosed systems, methods, and apparatuses are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter

BRIEF DESCRIPTION OF THE FIGURES

The description will be more fully understood with reference to the following figures, which are presented as exemplary aspects of the disclosure and should not be construed as a complete recitation of the scope of the disclosure, wherein.

DETAILED DESCRIPTION

Systems, methods, and apparatuses are disclosed herein for detecting non-decode events in indicia scanning settings. Indicia decoding systems are being deployed with ever-increasing frequency in settings where a single trained human may oversee many indicia decoding kiosks that are operated by untrained individuals. A key example of such a setting is a self-checkout installation in a retail environment.

A common problem with indicia decoding systems is a non-decode event. A non-decode event occurs when a user attempts to decode an indicium that is affixed to an item, but the indicia decoding system is unable to decode the indicium. Non-decode events can be caused by any of a number of factors which will be described in better detail below. A well-trained user will quickly notice a non-decode event upon occurrence, but an untrained user (such as those that commonly interact with a self-checkout installation) may not be aware that an indicium has not been decoded. In such a situation, the untrained user will often proceed to attempt to decode an indicium affixed to a different item under the assumption that the first indicium was successfully decoded, leading to a loss of inventory.

Even the best-trained supervising human will find it challenging to ensure that most non-decode events are detected and mitigated when managing large numbers of self-checkout installations. It is therefore desirable to implement a system that can automatically detect non-decode events in order to reduce supervisory workload and mitigate inventory loss.

Figure 1:
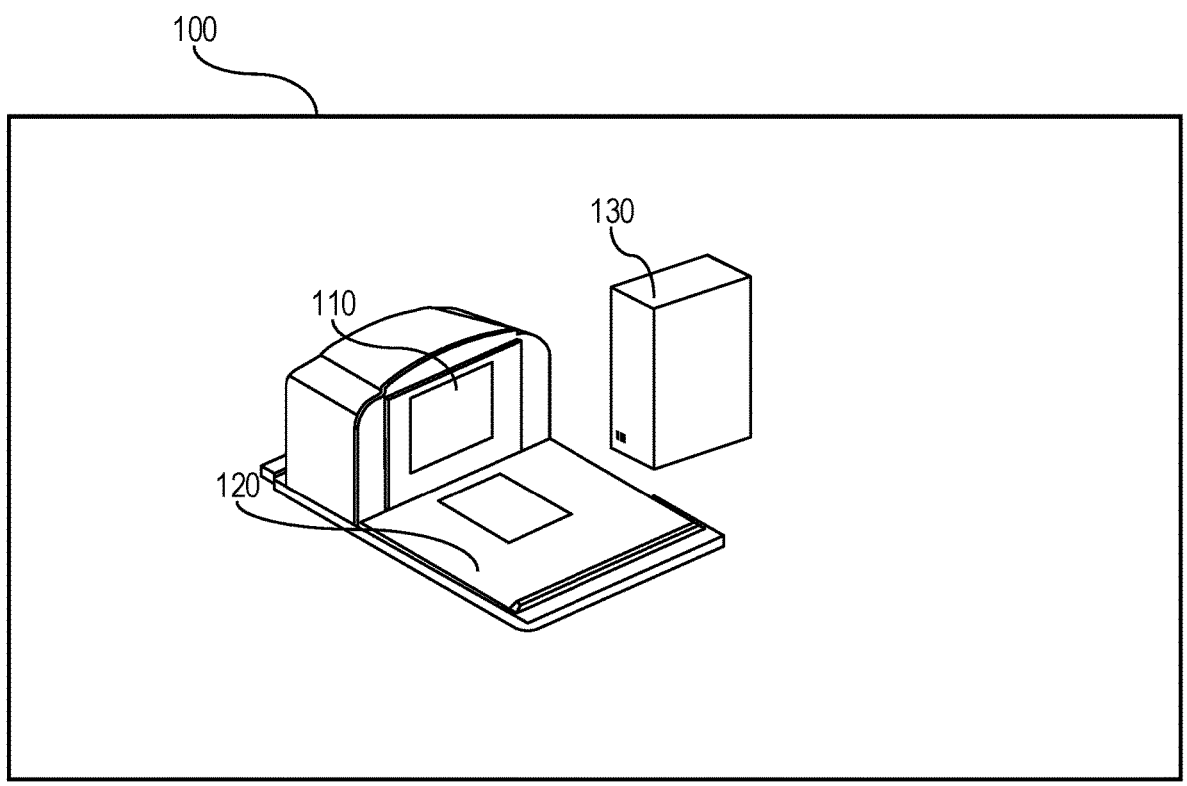
FIG. 1 illustrates an example indicia decoding system with an item that bears an indicium, according to an example embodiment of the present disclosure.

FIG. 1 illustrates an example indicia decoding system 100 with an item 130 that bears an indicium, according to an example embodiment of the present disclosure. The indicia decoding system 100 includes a platter 120 and a viewing window 110. A human user will pass the item 130 across the platter 120 in front of the viewing window 110. The indicia decoding system 100 will then attempt to decode an indicium affixed to the item 130 (see FIGS. 2-6).

When the attempt to decode is successful, the indicia decoding system 100 may notify the user that the indicium was decoded. The notification may be an auditory signal, a visual signal, or combinations thereof. The user may then proceed to a next item, going through a same process as has just been described.

When the attempt to decode is unsuccessful, the indicia decoding system 100 may notify the user as described above and may check for any of a number of conditions that may determine a further course of action. For example, the indicia decoding system 100 may attempt to verify that the item 130 is returning for a second decode attempt (see FIGS. 2 and 3). The indicia decoding system 100 may determine if the item 130 passed outside of a decoding range of the indicia decoding system 100 (see FIG. 4). The indicia decoding system 100 may track a direction of motion of the item 130 at varying points in time and compare the direction of motion at one time to the direction of motion at another time to determine whether the item 130 is returning for a second decode attempt (see FIG. 6).

When the indicia decoding system 100 determines that the item 130 is returning for a second decode attempt, the indicia decoding system 100 may repeat a process described above (see FIG. 7). The indicia decoding system 100 may log a number of unsuccessful decode attempts and may be configured to transmit a message to an alert module (see FIG. 2) after a predetermined number of unsuccessful decode attempts. The indicia decoding system 100 may be configured to take further action not described herein or may be configured to take no action.

When the indicia decoding system 100 determines that a non-decode event has occurred, but subsequently detects an item other than the item 130 crossing in front of the viewing window 110, the indicia decoding system 100 may be configured to transmit a message to an alert module (see FIG. 2). The indicia decoding system 100 may be configured to start a timer upon detecting a non-decode event, then transmit a message to an alert module when a predetermined period of time elapses without the indicia decoding system 100 detecting the item 130 returning for a second decode attempt.

Figure 2:
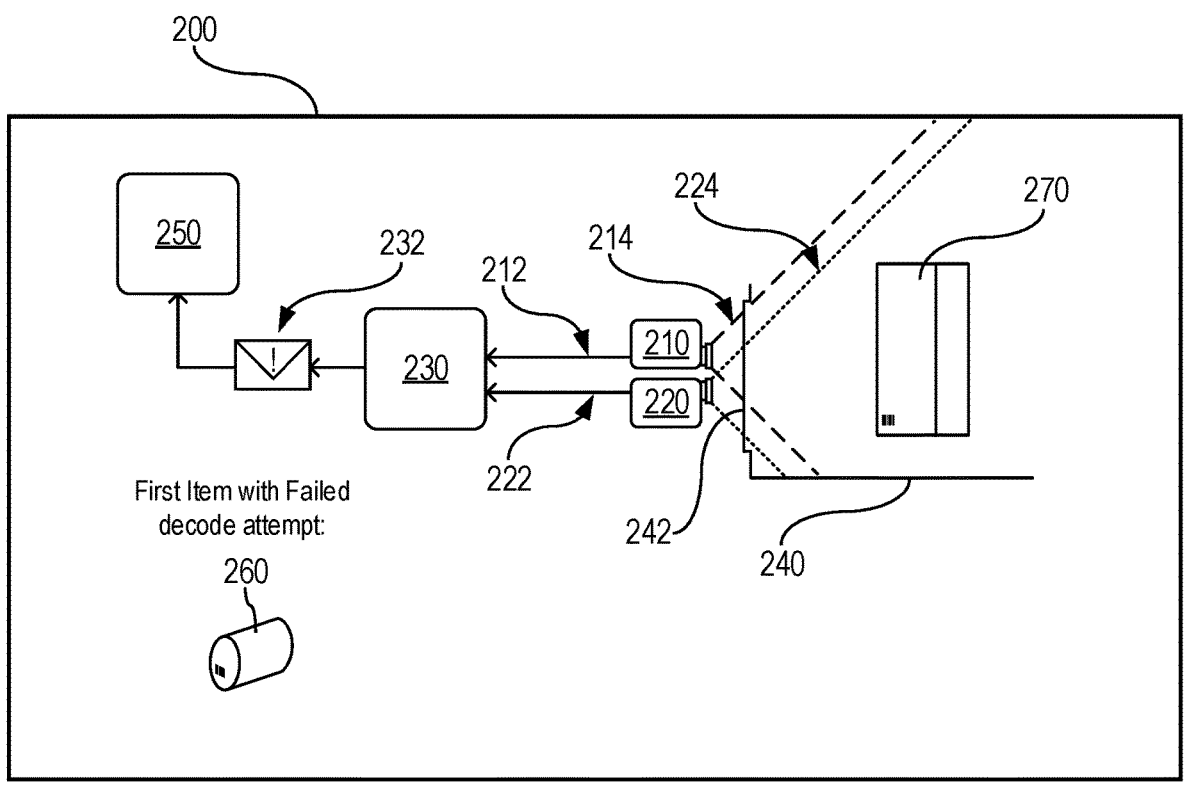
FIG. 2 illustrates an example indicia decoding system which is viewing an item which has appeared following a failed decode attempt, according to an example embodiment of the present disclosure.

FIG. 2 illustrates an example indicia decoding system 200 which is viewing a second item 270 which has appeared following a failed decode attempt, according to an example embodiment of the present disclosure. The example indicia decoding system 200 includes a depth imaging assembly 210 that sends depth data 212 about the second item 270 in a depth field of view 214 (depth FOV 214) to a processing device 230. The example indicia decoding system 200 also includes a 2D imaging assembly 220 that sends 2D data 222 about the second item 270 in a 2D field of view 224 (2D FOV 224) to the processing device 230. The depth imaging assembly 210 and the 2D imaging assembly 220 view the second item 270 through a viewing window 242 as it passes over a platter 240.

In this example scenario, the indicia decoding system 200 has previously detected a non-decode event in which a first item 260 passed over the platter 240. The processing device 230 analyzes the depth data 212 and the 2D data 222 to determine one or more characteristics of the first item 260. For example, the processing device 230 may determine a shape, color, texture, curvature, visual pattern, size, or combinations thereof for the first item 260. The indicia decoding system 200 may store the one or more characteristics of the first item 260 and, upon determining that the first item 260 has left the 2D FOV 224 without the indicia decoding system 200 decoding an indicium, the indicia decoding system 200 may begin searching for the second item 270 entering the depth FOV 214 or the 2D FOV 224.

When the indicia decoding system 200 detects the second item 270 entering the depth FOV 214 or the 2D FOV 224, the indicia decoding system 200 may determine one or more characteristics of the second item 270 as with the first item 260. The indicia decoding system 200 may then compare the one or more characteristics of the first item 260 with the one or more characteristics of the second item 270 in order to determine if the first item 260 and the second item 270 are a same item. The determination whether the first item 260 and the second item 270 are the same item may be based upon an exact match of the one or more characteristics or may be based upon a predetermined similarity threshold. Different characteristics of the one or more characteristics may be assigned weights and used to calculate a similarity score for the first item 260 and the second item 270, which may then be used to determine whether the first item 260 and the second item 270 are the same item.

Figure 3:
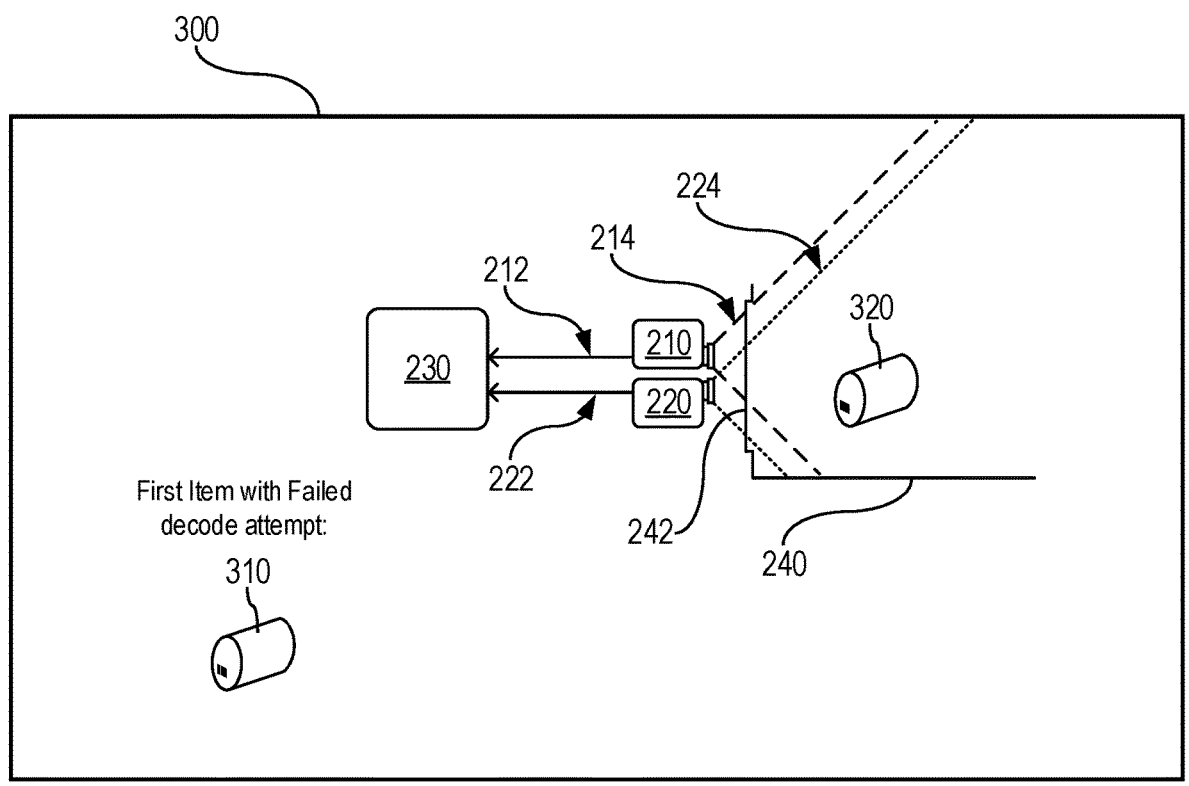
FIG. 3 illustrates an example indicia decoding system which is viewing an item that is returning for a second decode attempt after a failed decode attempt, according to an example embodiment of the present disclosure.

Further detail regarding the behavior of the example indicia decoding system 200 when the first item 260 and the second item 270 are the same item can be found in FIG. 3. In this example scenario, the first item 260 is not the same item as the second item 270. The processing device 230 detects that the first item 260 and the second item 270 are not the same item, and may be configured to send a message 232 that is indicative of a non-decode event to an alert module 250. The alert module 250 may then send a notification to a supervising human or take another predetermined action. For example, the alert module 250 may temporarily halt a transaction until the supervising human instructs the indicia decoding system 200 to resume.

FIG. 3 illustrates an example indicia decoding system 300 which is viewing a second item 320 that is returning for a second decode attempt after a failed decode attempt, according to an example embodiment of the present disclosure. The example indicia decoding system 300 includes a depth imaging assembly 210 that sends depth data 212 about the second item 320 in a depth field of view 214 (depth FOV 214) to a processing device 230. The example indicia decoding system 300 also includes a 2D imaging assembly 220 that sends 2D data 222 about the second item 320 in a 2D field of view 224 (2D FOV 224) to the processing device 230. The depth imaging assembly 210 and the 2D imaging assembly 220 view the second item 320 through a viewing window 242 as it passes over a platter 240.

In this example scenario, the indicia decoding system 300 has previously detected a non-decode event in which a first item 310 passed over the platter 240. The processing device 230 analyzes the depth data 212 and the 2D data 222 to determine one or more characteristics of the first item 310. For example, the processing device 230 may determine a shape, color, texture, curvature, visual pattern, size, or combinations thereof for the first item 310. The indicia decoding system 300 may store the one or more characteristics of the first item 310 and, upon determining that the first item 310 has left the 2D FOV 224 without the indicia decoding system 300 decoding an indicium, the indicia decoding system 300 may begin searching for the second item 320 entering the depth FOV 214 or the 2D FOV 224.

When the indicia decoding system 300 detects the second item 320 entering the depth FOV 214 or the 2D FOV 224, the indicia decoding system 300 may determine one or more characteristics of the second item 320 as with the first item 310. The indicia decoding system 300 may then compare the one or more characteristics of the first item 310 with the one or more characteristics of the second item 320 in order to determine if the first item 310 and the second item 320 are a same item. The determination whether the first item 310 and the second item 320 are the same item may be based upon an exact match of the one or more characteristics or may be based upon a predetermined similarity threshold. Different characteristics of the one or more characteristics may be assigned weights and used to calculate a similarity score for the first item 310 and the second item 320, which may then be used to determine whether the first item 310 and the second item 320 are the same item.

Further detail regarding the behavior of the example indicia decoding system 300 when the first item 310 and the second item 320 are not the same item can be found in FIG. 2. In this example scenario, the first item 310 is the same item as the second item 320. The processing device 230 thus concludes that the first item 310 is returning for a second decode attempt responsive to the previous unsuccessful attempt. The processing device 230 may be configured to treat the second item 320 as a new first item 310. Alternatively, the processing device 230 may be configured to track and store a number of unsuccessful decode attempts of the first item 310 and transmit a message to an alert module (see FIG. 2) after a predetermined number of unsuccessful attempts.

Figure 4:
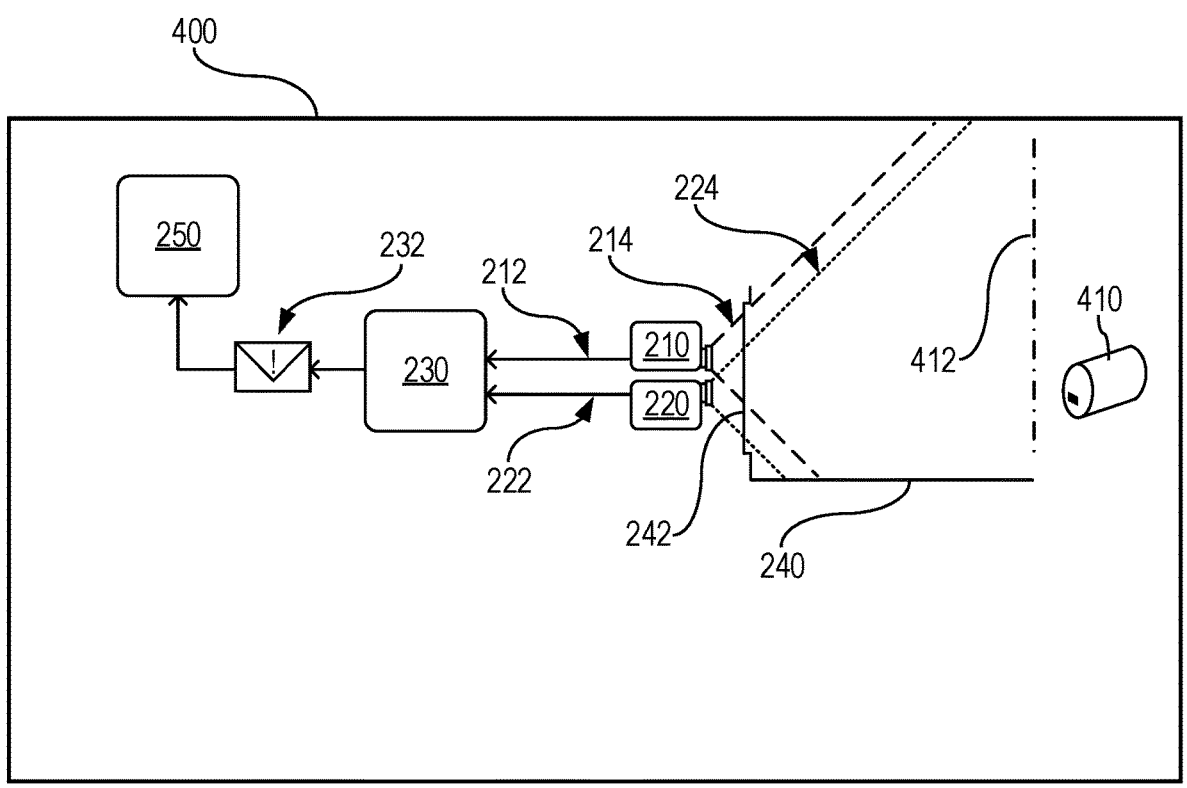
FIG. 4 illustrates an example indicia decoding system which is viewing an item that is passing outside of a decoding range of the system, according to an example embodiment of the present disclosure.

FIG. 4 illustrates an example indicia decoding system 400 which is viewing an item 410 that is passing outside of a decoding range 412 of the indicia decoding system 400, according to an example embodiment of the present disclosure. The example indicia decoding system 400 includes a depth imaging assembly 210 that sends depth data 212 about the item 410 in a depth field of view 214 (depth FOV 214) to a processing device 230. The example indicia decoding system 400 also includes a 2D imaging assembly 220 that sends 2D data 222 about the item 410 in a 2D field of view 224 (2D FOV 224) to the processing device 230. The depth imaging assembly 210 and the 2D imaging assembly 220 view the item 410 through a viewing window 242 as it passes over a platter 240.

In this example scenario, the item 410 is passing through the depth FOV 214 and the 2D FOV 224 outside of a decoding range 412 of the indicia decoding system 400. The indicia decoding system 400 will not be able to decode an indicium affixed to the item 410 due to the extreme distance at which the item 410 is being viewed, and so the processing device 230 may be configured to take any of a number of actions. In this example scenario, the processing device 230 is configured to send a message 232 indicative of a non-decode event to an alert module 250 (see FIG. 2). The processing device 230 may, however, be configured to instead search for a second item entering the depth FOV 214 and the 2D FOV 224 to determine if the item 410 is returning for a second decode attempt (see FIG. 2). The processing device 230 may also be configured to both send the message 232 and search for the second item, or may be configured to take no action. The processing device 230 may be configured to track and record a number of times that the item 410 passes outside of the decoding range 412 and may be configured to send the message 232 to the alert module 250 responsive to a predetermined number of passes outside of the decoding range 412. The processing device 230 may be configured such that after failing to decode an indicium affixed to a first item passing inside the decoding range 412, the processing device 230 will send the message 232 to an alert module 250 upon determining that a second item is passing outside of the decoding range 412. The processing device 230 may be configured to take no action and exclude a pass from a count of a number of passes if the processing device 230 determines that a second item is moving in a direction that is different from an initial direction of movement of the first item, even if the second item is passing outside of the decoding range 412 (see FIG. 6).

Figure 5:
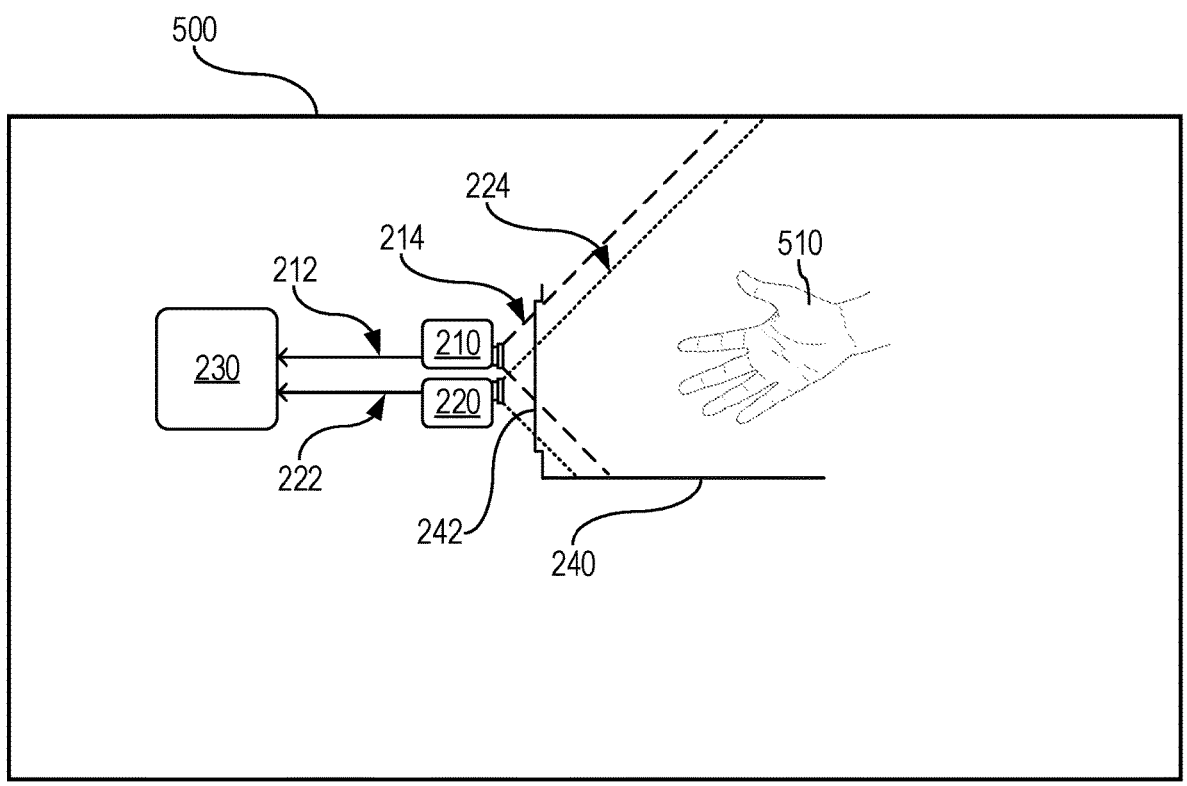
FIG. 5 illustrates an example indicia decoding system which is viewing a human hand, according to an example embodiment of the present disclosure.

FIG. 5 illustrates an example indicia decoding system 500 which is viewing a human hand 510, according to an example embodiment of the present disclosure. The example indicia decoding system 500 includes a depth imaging assembly 210 that sends depth data 212 about the human hand 510 in a depth field of view 214 (depth FOV 214) to a processing device 230. The example indicia decoding system 500 also includes a 2D imaging assembly 220 that sends 2D data 222 about the human hand 510 in a 2D field of view 224 (2D FOV 224) to the processing device 230. The depth imaging assembly 210 and the 2D imaging assembly 220 view the human hand 510 through a viewing window 242 as it passes over a platter 240.

When determining whether a failed attempt to decode an indicium has occurred, it is necessary to exclude things from consideration that may commonly be encountered by the indicia decoding system 500 but which are not items that are expected to bear indicia. The human hand 510 in this example scenario is one such thing. The processing device 230 may be configured to detect that the human hand 510 is in the depth FOV 214 and the 2D FOV 214 and exclude the human hand 510 from consideration as an item (see FIGS. 2, 3, 4, and 6). Such removal from consideration is beneficial because the processing device 230 may take undesired action if the processing device 230 treats the human hand 510 as an item that should bear an indicium for decoding.

The detection of the human hand 510 may be accomplished with pattern recognition, machine learning, gesture recognition, additional methods for detecting the human hand 510, or combinations thereof. The detection may be based upon the depth data 212, the 2D data 222, additional data not illustrated, or combinations thereof.

The processing device 230 may also be configured to detect and exclude additional things from consideration as an item (see FIGS. 2, 3, 4, and 6) which may be commonly encountered in a deployment environment. Examples of things which may be excluded include but are not limited to wallets, purses, keys, payment cards, human faces, human torsos, and eyeglasses.

Figure 6:
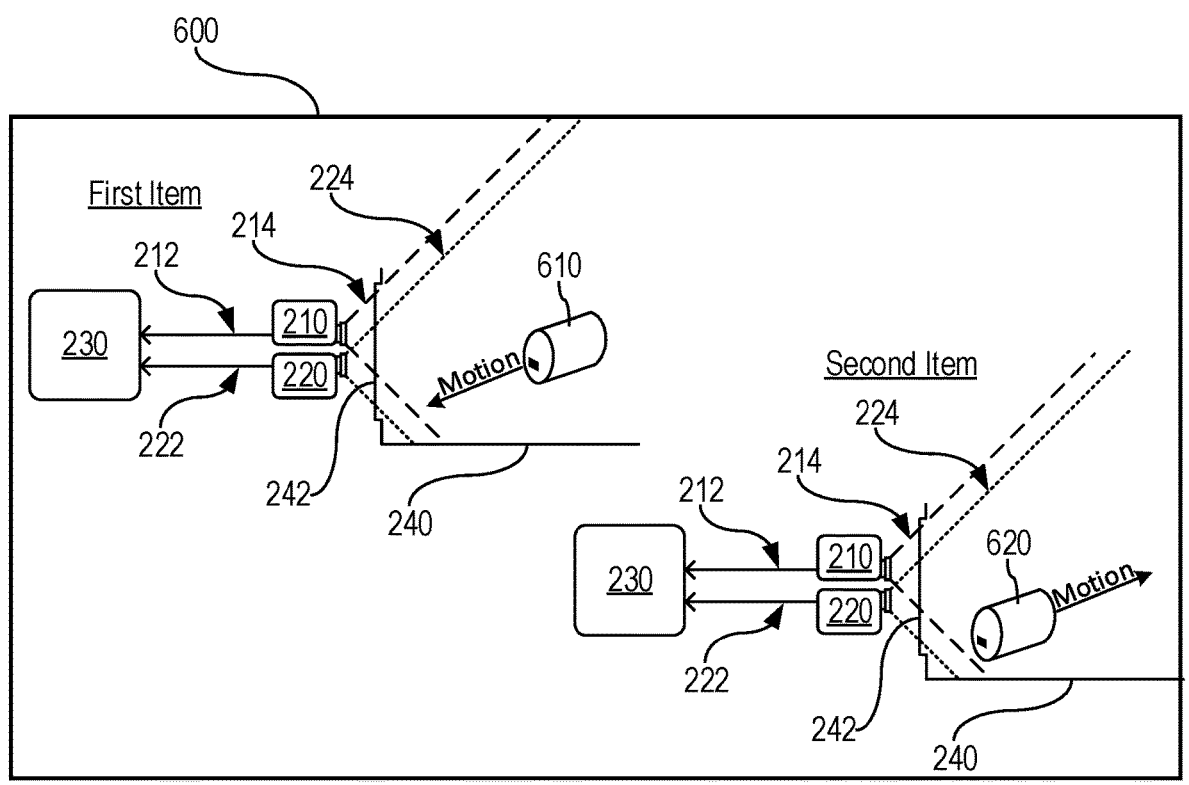
FIG. 6 illustrates an example indicia decoding system which is viewing an item that has an initial direction of travel followed by a new direction of travel different from the initial direction, according to an example embodiment of the present disclosure.

FIG. 6 illustrates an example indicia decoding system 600 which is viewing a first item 610 that has an initial direction of travel followed by a second item 620 that has a new direction of travel different from the initial direction, according to an example embodiment of the present disclosure. The example indicia decoding system 600 includes a depth imaging assembly 210 that sends depth data 212 about the first item 610 and the second item 620 in a depth field of view 214 (depth FOV 214) to a processing device 230. The example indicia decoding system 600 also includes a 2D imaging assembly 220 that sends 2D data 222 about the first item 610 and the second item 620 in a 2D field of view 224 (2D FOV 224) to the processing device 230. The depth imaging assembly 210 and the 2D imaging assembly 220 view the first item 610 and the second item 620 through a viewing window 242 as it passes over a platter 240.

In this example scenario, the indicia decoding system 600 fails to decode an indicium affixed to the first object 610 as it passes over the platter 240. The processing device 230 is configured to record an initial direction of travel of the first item 610. The first item 610 then leaves the depth FOV 214 and the 2D FOV 224. A second item 620 subsequently crosses the platter 240 with a different direction of travel from the initial direction of travel of the first item 610. In this example scenario, the processing device 230 is configured to detect that the second item 620 is actually the first item 610 returning for a second decode attempt based upon the different direction of travel of the second item 620. Data regarding direction of travel may be combined with other data to determine that the first item 610 is returning for a second decode attempt. For example, data regarding the direction of travel of the first item 610 and the second item 620 may be combined with data regarding characteristics of the first item 610 and the second item 620 (see FIG. 2) when making determinations about whether the first item 610 is returning for a second decode attempt.

The processing device 230 may be configured such that a determination that the first item 610 is returning for a second decode attempt based upon a direction of travel preempts other determinations regarding non-decode events. For example, the processing device 230 may be configured to disregard a determination that the second item 620 is passing outside of a decoding range of the indicia decoding system 600 (see FIG. 4) if the second item 620 has a direction of travel that is different from the initial direction of travel.

Additionally, if the first item 610 doesn't leave the depth FOV 214 or the 2D FOV 224 before the direction of travel of the first item 610 changes, the processing device 230 may be configured to begin treating the first item 610 as the second item 620. For example, if the direction of travel of the first item 610 changes to a direction of travel that is different from the initial direction of travel while the first item 610 is above the platter 240, the processing device 230 may conclude that the first item 610 is returning for a second decode attempt.

Figure 7:
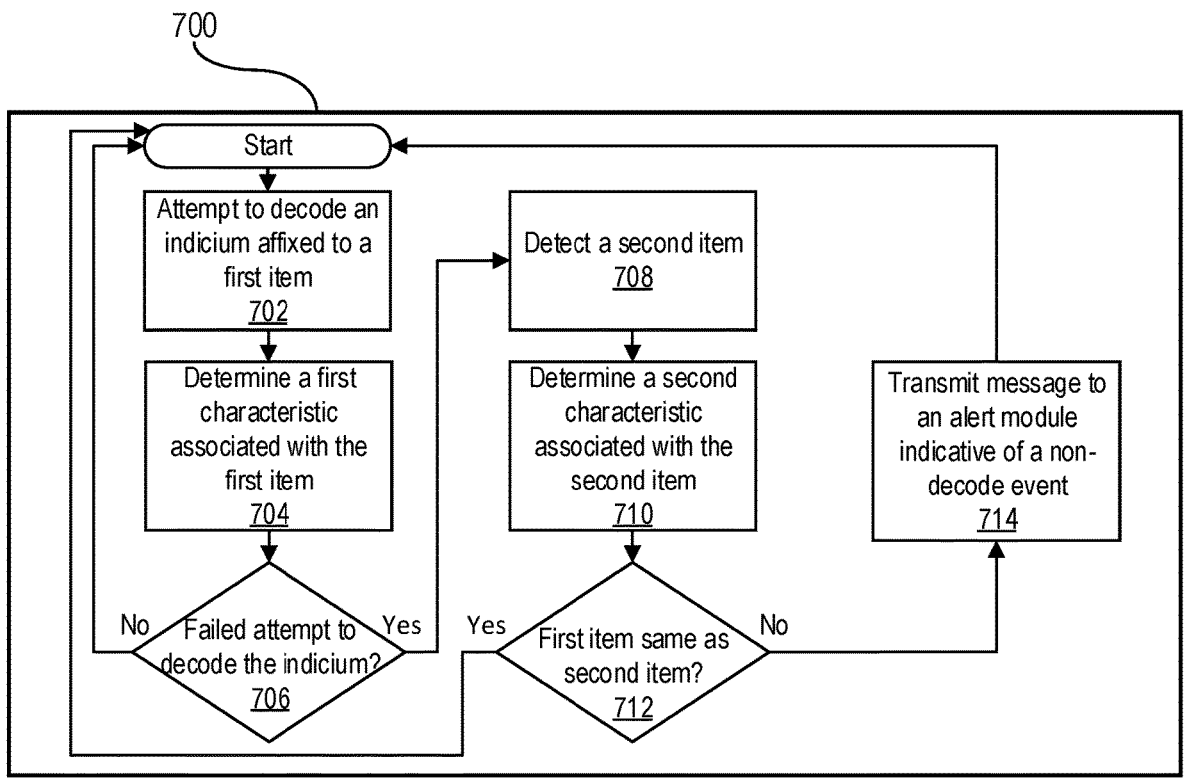
FIG. 7 illustrates an example method for detecting non-decode events in an indicia decoding setting, according to an example embodiment of the present disclosure.

FIG. 7 illustrates an example method 700 for detecting non-decode events in an indicia decoding setting, according to an example embodiment of the present disclosure. It should be appreciated that the example method 700 is presented with a high level of abstraction, and that the blocks of the flow chart depicted in FIG. 7 may consist of a number of activities, some of which may not be described herein.

At block 702, an example indicia decoding system attempts to decode an indicium that is affixed to a first item. The first item may be any object to which an indicium can be affixed. For example, the first item may be a piece of inventory in a retail setting. The attempt to decode the indicium may be responsive to the indicia decoding system detecting the first item entering a field of view of the indicia decoding system. The indicia decoding system then proceeds to block 704.

At block 704, the indicia decoding system determines a first characteristic associated with the first item. The first characteristic can be a color, a size, a shape, a texture, a curvature, or any combination thereof. The determination of the first characteristic may be dependent upon data from a depth imaging array, a 2D imaging array, additional sources, or combinations thereof. The indicia decoding system stores the first characteristic for future reference. The indicia decoding system then proceeds to block 706.

At block 706, the indicia decoding system detects a failed attempt to decode the indicium. The failed attempt can be caused by any of a number of factors, including but not limited to the item passing outside of a decoding range, the indicium being obstructed, the indicium not being present, the indicium not being of a targeted format, the item being oriented improperly, additional causes, or combinations thereof.

When the attempt to decode the indicium is successful, the indicia decoding system returns to the start of the method 700 to search for a new first item. The indicia decoding system may loop blocks 702 through 706 until an indicia decode attempt is unsuccessful. When the attempt to decode the indicium is unsuccessful, the indicia decoding system proceeds to block 708.

At block 708, the indicia decoding system detects a second item. The second item may be a different item from the first item, or the second item could be the first item returning for a second decode attempt. The indicia decoding system then proceeds to block 710.

At block 710, the indicia decoding system determines a second characteristic associated with the second item. The second characteristic can be a color, a size, a shape, a texture, a curvature, or any combination thereof. The determination of the second characteristic may be dependent upon data from a depth imaging array, a 2D imaging array, additional sources, or combinations thereof. The indicia decoding system then proceeds to block 712.

At block 712, the indicia decoding system compares the first characteristic associated with the first item with the second characteristic associated with the second item. The comparison may involve a determination that the first characteristic and the second characteristic are an exact match, or the comparison may involve a determination that the first characteristic and the second characteristic are within a predetermined threshold of similarity. A scoring system may be employed wherein each of several sub-characteristics within the first characteristic and the second characteristic are assigned weights, and then used to calculate a similarity score for the first characteristic and the second characteristic. For example, the indicia decoding system may assign weights of 0.5 for a color, 1.5 for a shape, 0.75 for a texture, etc. These weights are not intended to be indicative of preferred values or optimal values for weighting different sub-characteristics, and are instead merely intended to be illustrative of the concept of weighting said sub-characteristics when computing a similarity score.

When the indicia decoding system determines that the second item and the first item are a same item based upon the comparison of the second characteristic and the first characteristic, the indicia decoding system proceeds to the start, treating the second item as a new first item and attempting to decode an indicium affixed to the second item. The indicia decoding system may increment a counter indicative of a number of attempted decode attempts, and may instead proceed to block 714 if the counter reaches a predetermined value. If the indicium is successfully decoded, this counter is reset to zero to reflect that a new item is now being tracked. When the indicia decoding system determines that the second item and the first item are different items based upon the comparison of the second characteristic and the first characteristic, the indicia decoding system proceeds to block 714.

At block 714, the indicia decoding system transmits a message to an alert module indicative of a non-decode event. The alert module may then take any of a number of predefined actions, including but not limited to causing a supervising human to be presented with an alert message, pausing a transaction, any other action, or combinations thereof. The alert module may be configured to take no action until the alert module receives a predetermined quantity of messages. The indicia decoding system may then proceed to the start of the method to search for a next first item. Alternatively, the indicia decoding system may be configured to pause at block 714 until a supervising human unlocks the indicia decoding system, at which point the indicia decoding system proceeds to the start to search for a new first item.

Figure 8:
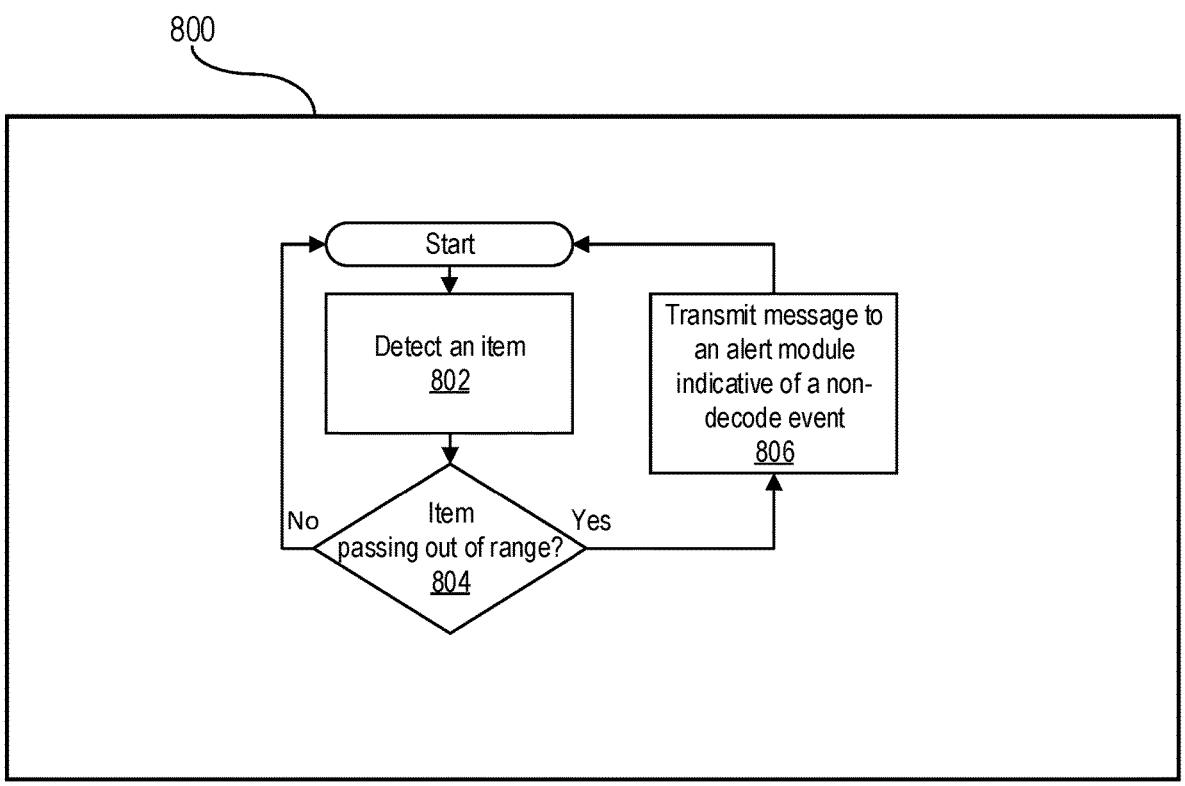
FIG. 8 illustrates an example method for detecting an item passing beyond a decoding range of an indicia decoding device, according to an example embodiment of the present disclosure.

FIG. 8 illustrates an example method 800 for detecting an item passing beyond a decoding range of an indicia decoding device, according to an example embodiment of the present disclosure. It should be appreciated that the example method 800 is presented with a high level of abstraction, and that the blocks of the flow chart depicted in FIG. 8 may consist of a number of activities, some of which may not be described herein.

At block 802, an example indicia decoding system detects an item that is entering a field of view of the indicia decoding system. The item may be any object to which an indicium can be affixed. For example, the item may be a piece of inventory in a retail setting. The indicia decoding system then proceeds to block 804.

At block 804, the indicia decoding system determines whether the item is passing the indicia decoding system outside of a decoding range of the indicia decoding system. For various reasons, a range at which an indicia decoding system is able to detect an item is often longer than a range at which the indicia decoding system is able to decode an indicium affixed to that item. For example, an item that is visible at a distance of 6 feet from an indicia scanning device's viewing window may bear an indicia that is small enough that individual features of the indicium cannot be discerned at such a distance. This may be due to a resolution of a 2D imaging assembly being insufficient for imaging indicia features at extreme ranges, or may be due to other factors.

The determination that an item is passing outside of a decoding range of the indicia decoding system may be based upon data from a depth sensor, data from a 2D sensor, additional data, or combinations thereof. The indicia decoding system may be configured to output a negative determination when a previously detected item which had a failed decode attempt is moving in a different direction that is different from an initial direction of travel outside of the decoding range, as this may be indicative of the previously detected item returning for a second decode attempt. In such a case, the indicia decoding system may subsequently expect to see the previously detected item moving within the decoding range and in a direction similar to the initial direction of travel.

When the item is passing within the decoding range, the indicia decoding system returns to the start to search for another item. The indicia decoding system may loop blocks 802 and 804 indefinitely if the indicia decoding system does not detect an item passing out of range, or the indicia decoding system may advance through the method 800 periodically or responsive to a determination external to the method 800.

When the item is passing outside of the decoding range, the indicia decoding system proceeds to block 806. Alternatively, the indicia decoding system may be configured to increment a counter indicative of a number of times an item has passed outside of the decoding range. In such a scenario, the indicia decoding system may be configured to proceed to the start when the counter is below a predetermined threshold, and proceed to block 806 when the counter reaches the predetermined threshold. The counter is reset when an indicium is decoded or the indicia decoding system proceeds to block 806.

At block 806, the indicia decoding system transmits a message to an alert module indicative of a non-decode event. The alert module may then take any of a number of predefined actions, including but not limited to causing a supervising human to be presented with an alert message, pausing a transaction, any other action, or combinations thereof. The alert module may be configured to take no action until the alert module receives a predetermined quantity of messages. The indicia decoding system may then proceed to the start of the method to search for a next item. Alternatively, the indicia decoding system may be configured to pause at block 806 until a supervising human unlocks the indicia decoding system, at which point the indicia decoding system proceeds to the start to search for a new item.

Figure 9:
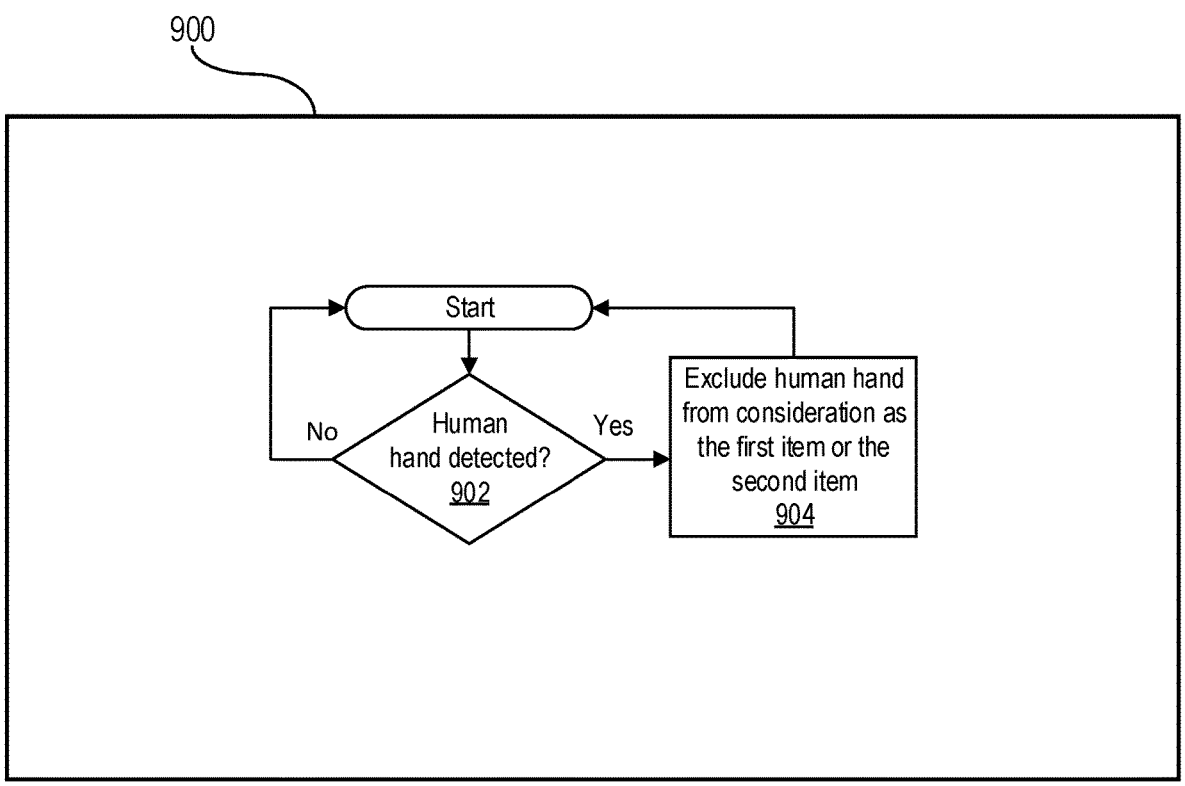
FIG. 9 illustrates an example method for detecting a human hand in an indicia decoding setting, according to an example embodiment of the present disclosure.

FIG. 9 illustrates an example method 900 for detecting a human hand in an indicia decoding setting, according to an example embodiment of the present disclosure. It should be appreciated that the example method 900 is presented with a high level of abstraction, and that the blocks of the flow chart depicted in FIG. 9 may consist of a number of activities, some of which may not be described herein.

At block 902, an example indicia decoding system determines whether a human hand is visible within a field of view of the indicia decoding system. The determination as to whether a human hand is visible may employ machine learning, pattern recognition, gesture recognition, other methods, or combinations thereof. The determination as to whether a human hand is visible may be based upon data from a depth imaging assembly, data from a 2D imaging assembly, additional data, or combinations thereof.

When a human hand is detected, the indicia decoding system proceeds to block 904. When a human hand is not detected, the indicia decoding system proceeds to the start of the method 900 to continue searching for human hands. The indicia decoding system may advance through the method 900 periodically or responsive to a determination external to the method 900.

At block 904, the indicia decoding system excludes the detected human hand from consideration as the first item or the second item. It will be apparent to those of skill in the art that an indicia decoding system as described herein that treats human hands as items for the purposes of detecting non-decode events will send large quantities of unwanted messages to an alert module. It is therefore desirable that such indicia decoding systems not treat human hands entering a field of view of the indicia decoding system as an item that is expected to bear an indicium.

The exclusion from consideration may be accomplished by tracking the human hand and continually discerning and excluding the human hand's features. This process may employ machine learning, pattern recognition, gesture recognition, other methods, or combinations thereof. The indicia decoding system then proceeds to the start of the method to detect any additional human hands that may be present in a field of view of the indicia decoding system.

Figure 10:
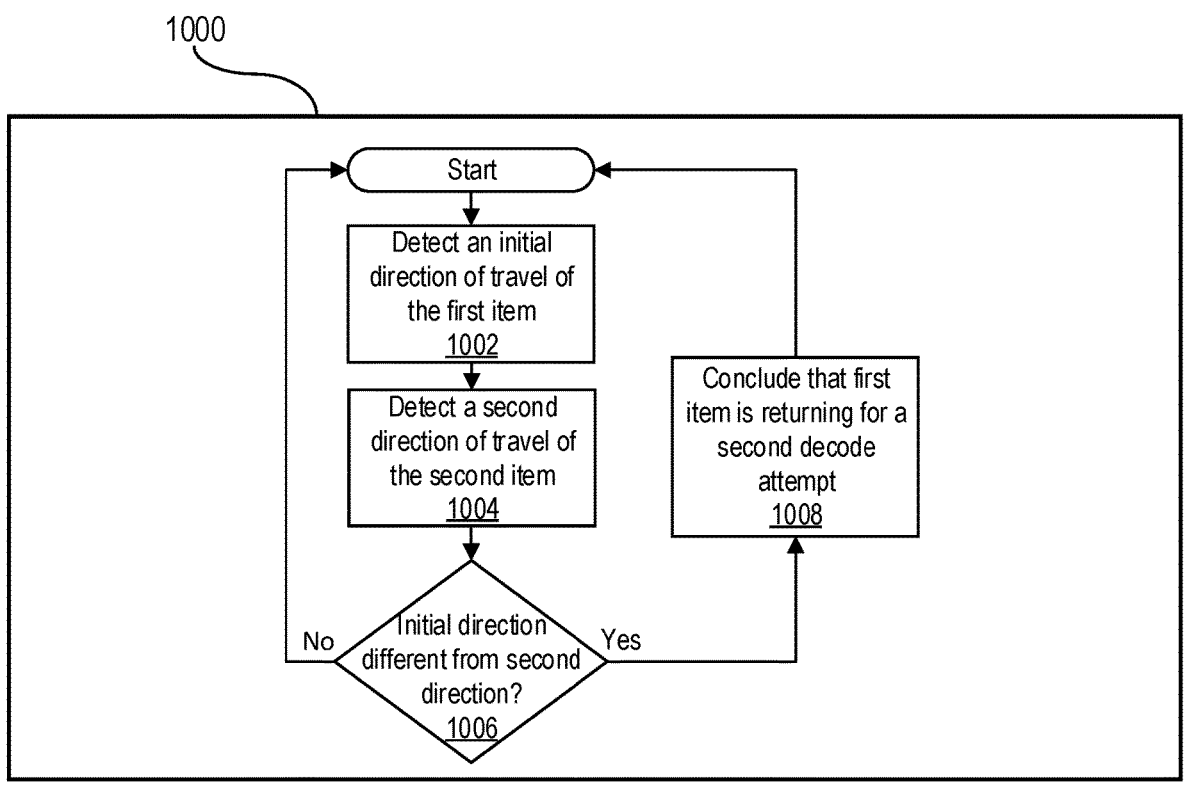
FIG. 10 illustrates an example method for determining if an item is returning for a second decode attempt in an indicia decoding setting, according to an example embodiment of the present disclosure.

FIG. 10 illustrates an example method 1000 for determining if an item is returning for a second decode attempt in an indicia decoding setting, according to an example embodiment of the present disclosure. It should be appreciated that the example method 1000 is presented with a high level of abstraction, and that the blocks of the flow chart depicted in FIG. 10 may consist of a number of activities, some of which may not be described herein.

At block 1002, an example indicia decoding system detects an initial direction of travel of a first item. The detection of the initial direction of travel may employ data from a depth imaging assembly, data from a 2D imaging assembly, additional data, or combinations thereof. The indicia decoding system stores the initial direction of travel for future reference. The indicia decoding system then proceeds to block 1004.

At block 1004, the indicia decoding system detects a second direction of travel of a second item. The second item may be the first item returning for a second decode attempt responsive to a failed decode attempt, or the second item may be a new item that the indicia decoding system has not yet encountered. The detection of the second direction of travel may employ data from a depth imaging assembly, data from a 2D imaging assembly, additional data, or combinations thereof. The indicia decoding system then proceeds to block 1006.

At block 1006, the indicia decoding system determined if the initial direction of travel is different from the second direction of travel. The determination may be based upon predetermined thresholds of similarity, or may be an exact comparison.

When the initial direction of travel is the same as the second direction of travel, the indicia decoding system returns to the start of the method 1000 to compare additional directions of travel of additional items. The indicia decoding system may store the second direction of travel and treat the second direction of travel as a new initial direction of travel in a next comparison. When the initial direction of travel is different from the second direction of travel, the indicia decoding system proceeds to block 1008.

At block 1008, the indicia decoding system concludes that the first item is returning for a second decode attempt. This conclusion may be further based upon additional data (see FIGS. 2 and 7) and may override other determinations about the second item (see FIG. 8). Upon concluding that the first item is returning for a second decode attempt, the indicia decoding system proceeds to the start of the method 1000 to initiate a next comparison of subsequent items' directions of travel.

It will be appreciated that the various features, methods, and devices described herein may be combined in any manner to suit the particular needs of real-world implementations. It will also be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed is:

1. A system for decoding indicia comprising:
a depth imaging assembly operable to capture depth data of items;
a 2-dimesional (2D) imaging assembly operable to capture 2D data of items that is different from the depth data of items; and
a processing device, wherein the processing device is configured to
(a) attempt to detect and decode an indicium affixed to a first-passed item that is passing through at least one of a field of view of the 2D imaging assembly or a field of view of the depth imaging assembly,
(b) determine a first characteristic associated with the first-passed item based on depth data from the depth imaging assembly, and (c) responsive to the first-passed item leaving the field of view of the 2D imaging assembly upon a failed attempt to decode the indicium,
  (i) detect a second-passed item that is passing through the field of view of the 2D imaging assembly and the field of view of the depth imaging assembly,
  (ii) determine a second characteristic associated with the second-passed item based on depth data from the depth imaging assembly,
  (iii) determine if the first-passed item is a same item as the second-passed item based on comparing the first characteristic the second characteristic, and
  (iv) responsive to determining that the first-passed item and the second-passed item are not the same item, transmit a message to an alert module that is indicative of a non-decode event, and (v) responsive to determining that the first-passed item and the second-passed item are the same item, the processing device proceeds to at least one of (i) attempt to decode an indicium affixed to the second-passed item or (ii) start a search for a new first-passed item,
wherein the field of view of the 2D imaging assembly and the field of view of the depth imaging assembly at least partially overlap, wherein responsive to a failed attempt to decode the indicium, the system is further configured to detect whether the first-passed item is returning for a second decode attempt based on depth data from the depth imaging assembly indicating that a direction of travel of the first-passed item being different from an initial direction of travel of the first-passed item, and wherein the depth imaging assembly and the 2d imaging assembly are behind at least one window of a housing.

2. The system of claim 1, wherein the processing device is further configured to determine if the first-passed item is passing through a field of view outside of a decoding range of the system, and responsive to determining that the first-passed item is passing through the field of view outside of the decoding range, the processing device is configured to transmit a message to an alert module that is indicative of a non-decode event.

3. The system of claim 1, wherein the processing device is further configured to determine if the second-passed item is passing through the field of view outside of a decoding range of the system, and responsive to determining that the second-passed item is passing through the field of view outside of the decoding range, the processing device is configured to transmit a message to an alert module that is indicative of a non-decode event.

4. The system of claim 1, wherein the processing device is further configured to detect a human hand, and responsive to detecting the human hand, the system is configured to exclude the human hand from consideration as the first-passed item or the second-passed item.

5. The system of claim 1, wherein responsive to determining that the first-passed item and the second-passed item are the same item, the system is configured to attempt to decode an indicium affixed to the second-passed item, and responsive to a failed attempt to decode the indicium, the system is configured to repeat steps (i) through (iv) until the device either successfully decodes the indicium or transmits a message to an alert module that is indicative of a non-decode event.

6. The system of claim 1, wherein the first characteristic and the second characteristic include at least one of a color, a size, a shape, a texture, or a curvature of the first-passed item.

7. A method for automatically analyzing behavior of a system user, comprising: the user using a system comprising a depth imaging assembly to capture depth data of items, a 2-dimensional (2D) imaging assembly to capture 2D data of items that is different from the depth data of items, wherein both assemblies are behind a window of a housing, and a processing device performing the further steps of:
  (a) attempting to detect and decode an indicium affixed to a first-passed item that is passing through at least one of a field of view of the 2D imaging assembly or a field of view of the depth imaging assembly,
  (b) determining a first characteristic associated with the first-passed item based on depth data from the depth imaging assembly, and
  (c) responsive to the first-passed item leaving the field of view of the 2D imaging assembly upon a failed attempt to decode the indicium,
    (i) detecting a second-passed item that is passing through the field of view of the 2D imaging assembly and the field of view of the depth imaging assembly,
    (ii) determining a second characteristic associated with the second-passed item based on depth data from the depth imaging assembly,
    (iii) determining if the first-passed item is a same item as the second-passed item based on comparing the first characteristic and the second characteristic,
    (iv) responsive to determining that the first-passed item and the second-passed item are not the same item, transmitting a message to an alert module that is indicative of a non-decode event, and (v) responsive to determining that the first-passed item and the second-passed item are the same item, the processing device proceeds to at least one of (i) attempt to decode an indicium affixed to the second-passed item or (ii) start a search for a new first-passed item,
wherein the field of view of the 2D imaging assembly and the field of view of the depth imaging assembly at least partially overlap, wherein responsive to a failed attempt to decode the indicium, the processing device detecting whether the first-passed item is returning for a second decode attempt based on depth data from the depth imaging assembly indicating that a direction of travel of the first-passed item being different from an initial direction of travel of the first-passed item.

8. The method of claim 7, further comprising determining if the first-passed item is passing through the field of view outside of a decoding range of the system, and responsive to determining that the first-passed item is passing through the field of view outside of the decoding range, transmitting a message to an alert module that is indicative of a non-decode event.

9. The method of claim 7, further comprising determining if the second-passed item is passing through the field of view outside of a decoding range of the system, and responsive to determining that the second-passed item is passing through the field of view outside of the decoding range, transmitting a message to an alert module that is indicative of a non-decode event.

10. The method of claim 7, further comprising detecting a human hand, and responsive to detecting the human hand, excluding the human hand from consideration as the first-passed item or the second-passed item.

11. The method of claim 7, wherein the first characteristic includes at least one of a color, a size, a shape, a texture, or a curvature of the first-passed item.

12. The method of claim 7, wherein the second characteristic includes at least one of a color, a size, a shape, a texture, or a curvature of the second-passed item.

13. A non-transitory computer-readable medium containing instructions which, when executed by a processing device, cause the processing device to:
(a) attempt to detect and decode an indicium affixed to a first-passed item that is passing through at least one of a field of view of a 2-dimensional (2D) imaging assembly operable to capture 2D data or a field of view of a depth imaging assembly operable to capture depth data that is different from the 2D data, wherein the indicium is a universal product code, and wherein both assemblies are behind a window of a housing;
(b) determine a first characteristic associated with the first-passed item based on depth data from the depth imaging assembly, wherein the first characteristic is at least one of a color, a size, a shape, or a curvature of the first-passed item; and
(c) responsive to a failed attempt to decode the indicium,
(i) detect a second-passed item that is passing through the field of view of the 2D imaging assembly and the field of view of the depth imaging assembly,
(ii) determine a second characteristic associated with the second-passed item based on depth data from the depth imaging assembly wherein the second characteristic is at least one of a color, a size, a shape, or a curvature of the second-passed item,
(iii) determine if the first-passed item is a same item as the second-passed item based on comparing the first characteristic and the second characteristic,
(iv) responsive to determining that the first-passed item and the second-passed item are not the same item, transmit a message to an alert module that is indicative of a non-decode event, and (v) responsive to determining that the first-passed item and the second-passed item are the same item, the processing device proceeds to at least one of (i) attempt to decode an indicium affixed to the second-passed item or (ii) start a search for a new first-passed item,
wherein the field of view of the 2D imaging assembly and the field of view of the depth imaging assembly at least partially overlap, wherein responsive to a failed attempt to decode the indicium, the processing device detecting whether the first-passed item is returning for a second decode attempt based on depth data from the depth imaging assembly indicating that a direction of travel of the first-passed item being different from an initial direction of travel of the first-passed item.

14. The non-transitory computer-readable medium of claim 13, containing further instructions which cause the processing device to determine if the first-passed item or the second-passed item is passing through the field of view outside of a decoding range of the system, and responsive to determining that the first-passed item or the second-passed item is passing through the field of view outside of the decoding range, cause the processing device to transmit a message to an alert module that is indicative of a non-decode event.

15. The non-transitory computer-readable medium of claim 13, containing further instructions which cause the processing device to detect a human hand, and responsive to detecting the human hand, cause the processing device to exclude the human hand from consideration as the first-passed item or the second-passed item.

* * * * *